United States Patent
Gartner et al.

(10) Patent No.: US 7,275,518 B1
(45) Date of Patent: Oct. 2, 2007

(54) TORQUE-BASED POWERTRAIN CONTROL FOR VEHICLES

(75) Inventors: Paul Gartner, Dearborn, MI (US);
Douglas Martin, Canton, MI (US);
Ryan McGee, Ann Arbor, MI (US);
Chris Kapolnek, Dearborn, MI (US);
Carol Okubo, Belleville, MI (US);
Kenneth Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/380,793

(22) Filed: Apr. 28, 2006

(51) Int. Cl.
*F02P 5/14* (2006.01)
(52) U.S. Cl. .............................. 123/406.23; 123/406.55
(58) Field of Classification Search ........... 123/406.23, 123/435–436, 399, 406.55
See application file for complete search history.

(56) References Cited

U.S. PATENT DOCUMENTS

| | | | |
|---|---|---|---|
| 5,109,695 A | 5/1992 | James et al. | |
| 5,935,042 A | 8/1999 | Thomas et al. | |
| 6,065,446 A | 5/2000 | Engl et al. | |
| 6,119,063 A | 9/2000 | Hieb et al. | |
| 6,176,218 B1 | 1/2001 | Beechie et al. | |
| 6,176,808 B1 | 1/2001 | Brown et al. | |
| 6,188,951 B1 | 2/2001 | Beechie et al. | |
| 6,279,531 B1 | 8/2001 | Robichaux et al. | |
| 6,314,802 B1 | 11/2001 | Wu et al. | |
| 6,349,700 B1 | 2/2002 | Buckland et al. | |
| 6,363,316 B1 | 3/2002 | Soliman et al. | |
| 6,460,409 B1 | 10/2002 | Soliman et al. | |
| 6,553,958 B1 | 4/2003 | Kolmanovsky et al. | |
| 6,664,651 B1 | 12/2003 | Kotre et al. | |
| 6,688,282 B1 | 2/2004 | Okubo | |
| 6,691,807 B1 | 2/2004 | Bhavsar et al. | |
| 6,777,904 B1 | 8/2004 | Degner et al. | |
| 6,820,589 B2 | 11/2004 | Okubo et al. | |
| 6,827,167 B2 | 12/2004 | Cikanek et al. | |
| 6,845,305 B1 | 1/2005 | Raftari et al. | |
| 6,877,480 B2 | 4/2005 | Persson et al. | |
| 7,085,631 B2 * | 8/2006 | McGee et al. ................. 701/22 |
| 2003/0173123 A1 | 9/2003 | Nakanowatari | |
| 2006/0025904 A1 | 2/2006 | McGee et al. | |

FOREIGN PATENT DOCUMENTS

DE 19739567 11/1999

* cited by examiner

*Primary Examiner*—Hai Huynh
(74) *Attorney, Agent, or Firm*—Diana D. Brehob; Bir Law, PLC; David S. Bir (57) ABSTRACT

A system and method for controlling a vehicle powertrain having an internal combustion engine include determining a difference between a desired engine torque and a current engine torque, adjusting the difference based on a stored torque offset corresponding to a current engine speed, and controlling the engine to produce a torque corresponding to the adjusted torque difference. The stored torque offset is adjusted when the engine is operating in a predetermined engine speed range based on a steady-state difference between the desired and current engine torque to reduce the steady-state difference to zero. The adjusted torque difference may be limited by a maximum-engine-torque-available parameter and a minimum-engine-torque-available parameter, which is based on an operating temperature, such as the engine coolant temperature. The system and method may also include controlling spark to rapidly reduce current engine torque to the adjusted torque difference value.

20 Claims, 4 Drawing Sheets

TORQUE-BASED POWERTRAIN CONTROL FOR VEHICLES

BACKGROUND OF THE INVENTION

1. Technical Field

The present invention relates to systems and methods for controlling a vehicle powertrain.

2. Background Art

Vehicle manufacturers continually strive to improve fuel economy and reduce emissions while meeting customer expectations for performance and drivability. The availability of increasingly more powerful powertrain control computers has enabled more precise control of the vehicle powertrain and more efficient use of available energy to power the vehicle and related accessories. While the use of closed-loop or feedback control is generally preferred for lower feedgas emissions and best utilization of energy provided by conventional or alternative fuels, fuel cells, and/or batteries, the availability and accuracy of the sensors or estimators used to provide feedback to the controller may limit the operating conditions where closed-loop control is feasible. In addition, various compromises may be necessary to accommodate manufacturing and assembly variation and component wear over the vehicle lifetime of the vehicle.

For vehicle powertrains that include an internal combustion engine, either alone or in combination with other power sources as in a hybrid vehicle, accurate control of the combustion process is desirable to achieve emissions and fuel economy goals. To maintain stable combustion under varying engine, vehicle, and accessory operating conditions for desired fuel economy and emissions, the airflow and fuel supplied to the engine cylinders must be accurately controlled, particularly when the engine is operated at low load, such as during decelerations and/or idling. Precise airflow control is generally more problematic than fuel control under low load conditions. Conventional vehicles may operate in low-load conditions using closed-loop control of engine speed using airflow and spark to maintain stable combustion. The combustion stability limit may be defined in terms of airflow, or a corresponding engine torque value. Thus, a minimum engine torque may be set to ensure stable combustion. This torque value, also referred to as the "misfire torque limit," is the lower bound of the engine torque production. In many vehicles, a buffer or error margin is provided such that the misfire torque limit is set above the true combustion stability limit. This buffer helps to ensure that the vehicle will not operate in the unstable combustion region, despite various factors such as throttle valve variability, engine friction losses that vary with temperature, variability in combustion efficiency associated with fuel variability, age and wear of the engine components, varying engine, vehicle, and ambient operating conditions, etc.

In a vehicle such as a hybrid electric vehicle (HEV) where the engine is operated in a torque control mode rather than an engine-speed control mode, the engine speed is generally independent of the combustion cylinder air mass and the spark ignition angle, and is therefore unsuitable for use in maintaining combustion stability. Excess torque produced by the engine in an HEV may translate into a charging current for the battery, which must be controlled to manage the battery performance and useful life. As such, it is desirable to set the misfire torque limit as accurately as possible while accommodating changes in the combustion stability limit from vehicle-to-vehicle as well as changes in operating conditions of a particular vehicle.

Systems and methods for adapting or adjusting the misfire torque limit to accommodate manufacturing variations and changing operating conditions are disclosed in US Pat. App. 2006/0025904, commonly owned by the assignee of the present invention. While suitable for many applications, the systems and methods disclosed adapt the misfire torque limit only under specific conditions that may require the engine to run longer or at higher speeds than otherwise required for current driving conditions. In addition, some extreme variations in operating conditions may not be accommodated if the specific entry conditions are not satisfied.

SUMMARY OF THE INVENTION

A system and method for controlling a vehicle powertrain having an internal combustion engine include determining a difference between a desired engine torque and a current engine torque, adjusting the difference based on a stored torque offset corresponding to a current engine speed, and controlling the engine to produce a torque corresponding to the adjusted torque difference. The stored torque offset is adjusted when the engine is operating in a predetermined engine speed range based on a steady-state difference between the desired and current engine torque to reduce the steady-state difference to zero. The adjusted torque difference may be limited by a maximum-engine-torque-available parameter and a minimum-engine-torque-available parameter, which is based on an operating temperature, such as the engine coolant temperature. The system and method may also include monitoring the rate of change of the desired engine torque and controlling spark to rapidly reduce current engine torque to the adjusted torque difference value.

Embodiments of the present invention include a controller implementing proportional-integral (PI) feedback control of engine torque with anti-windup integrator control logic where the controller determines a difference between a torque feedback signal from an electrical machine and a desired engine torque, limits the difference term to a calibratable range, and adjusts the integral term of the PI control using a learned torque offset value corresponding to a current engine speed range.

The present invention provides a number of advantages. For example, the present invention provides a more robust closed-loop engine torque control strategy that allows operation of the engine nearer the combustion stability under varying ambient and operating conditions while accommodating component variation and wear. The present invention provides more frequent updates of learned torque offset values to improve torque control when operating under low-load or idle conditions. Additional robustness for rapid accelerator pedal changes (tipout) and idling is provided using dynamic spark retard to more rapidly achieve a desired engine torque, which avoids overcharging the battery in HEV applications.

The above advantages and other advantages, objects, and features of the present invention will be readily apparent from the following detailed description of the preferred embodiments when taken in connection with the accompanying drawings.

DETAILED DESCRIPTION

The present invention is described with reference to a representative HEV embodiment having a vehicle powertrain including an internal combustion engine, a battery, and an electrical machine. However, those of ordinary skill in the art will recognize that the present invention may also be used in other applications including other hybrid vehicle configurations and conventional vehicles having an internal combustion engine with a measured or estimated torque feedback signal provided to the powertrain controller to implement closed loop torque control as described herein. Similarly, while the present invention is described with respect to representative embodiments, various features of the invention illustrated and described with respect to any one embodiment may be combined with features in any other embodiment(s) to form embodiments within the scope of the invention that are not explicitly illustrated or described.

Figure 1:
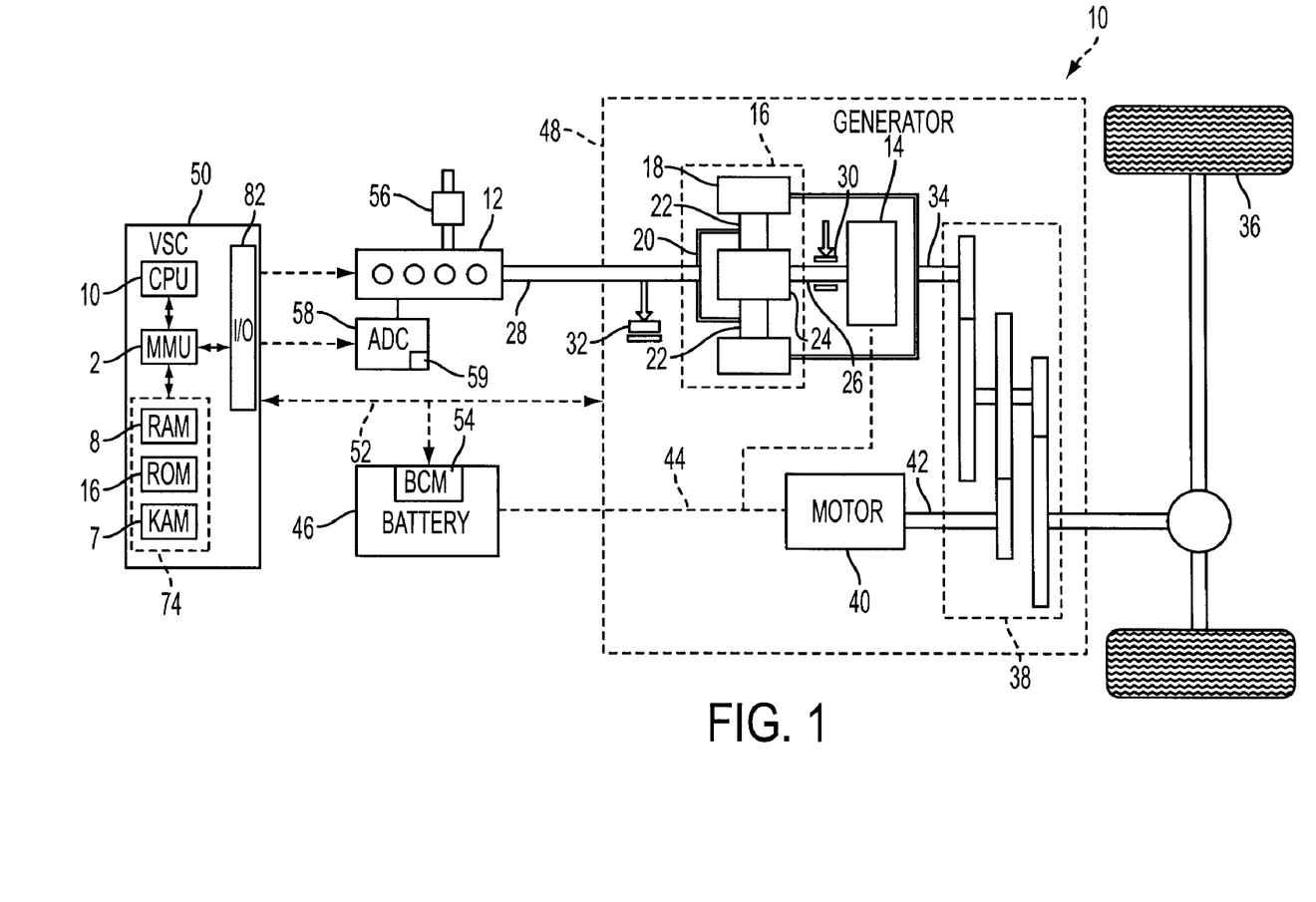
FIG. 1 is a schematic block diagram of a representative hybrid electric vehicle (HEV) embodiment of a system and method for controlling a vehicle powertrain according to the present invention.

Referring now to FIG. 1, a schematic block diagram representation of a vehicle 10 is shown to illustrate one embodiment of a system or method for controlling a vehicle powertrain according to the present invention. Vehicle 10 generally represents any vehicle having a conventional or hybrid electric powertrain with an internal combustion engine (ICE) 12. In the particular embodiment of an HEV 10 illustrated in FIG. 1, the powertrain includes engine 12 and an electric machine or generator 14. Engine 12 and generator 14 are connected through a power transfer unit or transmission, which in this embodiment is implemented by a planetary gearset 16. Of course, other types of power transfer units, including other gearsets and transmissions may be used to connect engine 12 to generator 14 depending upon the particular configuration of the application or implementation. Planetary gearset 16 includes a ring gear 18, a carrier 20, planet gears 22, and a sun gear 24.

Electrical machine 14 can be used as a generator to provide electric current to charge battery 46 or operate motor 40, or as a motor to provide an output torque to shaft 26 connected to sun gear 24. Similarly, operation of engine 12 supplies torque to shaft 28, which is connected to carrier 20. A brake 30 is provided for selectively stopping rotation of shaft 26, thereby locking sun gear 24 in place. Because this configuration allows torque to be transferred from electrical machine 14 to ICE 12, a one-way clutch 32 is provided so that shaft 28 rotates in only one direction. Electrical machine 14 can be used to control the rotational speed of engine 12 via planetary gearset 16 and shaft 28 when and if desired.

As also illustrated in the embodiment of FIG. 1, ring gear 18 is connected to a shaft 34, which is connected to vehicle drive wheels 36 through a second gear set or transmission 38. Vehicle 10 includes a second electrical machine, or motor 40, which can be used to output torque to shaft 42. Other vehicles within the scope of the present invention may have different electric machine arrangements, such as more or less than two electric machines. In the embodiment shown in FIG. 1, both electrical machines 14, 40 may be operated as motors using electric current from battery 46 or another source of electric current to provide a desired output torque. Alternatively, both machines 14, 40 may be operated as generators supplying electrical power to a high voltage bus 44 and/or to an energy storage device, represented by high voltage battery 46. Of course, other types of energy storage devices and/or output devices can be used with the vehicle depending upon the particular application or implementation. For example, a device such as a capacitor bank can be used to selectively store and supply electrical energy. Alternatively, a device such as a fuel cell may be used in conjunction with a battery and/or capacitor to provide electrical power for the vehicle 10.

As shown in FIG. 1, motor 40, generator 14, planetary gear set 16, and a portion of second gear set 38 may generally be referred to as a transaxle 48. One or more controllers 50 implemented in hardware and/or software are provided to control engine 12 and the components of transaxle 48. In the embodiment of FIG. 1, controller 50 is a vehicle system controller (VSC). Although VSC 50 is shown as a single controller, it may include multiple hardware and/or software controllers. For example, VSC 50 may include a separate powertrain control module (PCM), which could be software embedded within VSC 50, or the PCM could be implemented by a separate hardware device with corresponding software. Those of ordinary skill in the art will recognize that a controller may be implemented by a dedicated hardware device that may include programmed logic and/or an embedded microprocessor executing instructions to control the vehicle and powertrain. A controller area network (CAN) 52 may be used to communicate control data and/or commands between VSC 50, transaxle 48, and one or more other controllers, such as battery control module (BCM) 54. For example, BCM 54 may communicate data such as battery temperature, state-of-charge (SOC), discharge power limit, and/or other operating conditions or parameters of battery 46. Devices other than battery 46 may also have dedicated controllers or control modules that communicate with VSC 50 to implement control of the vehicle and powertrain. For example, an engine control unit (ECU) may communicate with VSC 50 to control operation of engine 12. In addition, transaxle 48 may include one or more controllers, such as a transaxle control module (TCM), configured to control specific components within 48, such as generator 14 and/or motor 40.

Any or all of the various controllers or control modules, such as VSC 50 and BCM 54 may include a microprocessor based central processing unit (CPU) 70 in communication with a memory management unit (MMU) 72 that manages various computer-readable storage media 74. The computer readable storage media preferably include various types of volatile and non-volatile memory such as a read-only memory (ROM) 76, a random-access memory (RAM) 78, and a keep-alive memory (KAM) 80. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by CPU 70 in controlling the engine, vehicle, or various subsystems. For controller architectures that do not include MMU 72, CPU 70 may communicate directly with one or more storage media 74. CPU 70 communicates with the various sensors and actuators of the engine, vehicle, etc. via an input/output (I/O) interface 82.

Vehicle 10 may also include one or more emission control devices, generally represented by block 56. For example, vehicle 10 may include a carbon canister associated with the vehicle fuel system and configured to collect fuel vapors to reduce emissions. From time to time, the carbon canister may be purged, such that collected vapors are taken into the engine air intake system and combusted. Emission control devices 56 may also include one or more catalysts or catalytic reactors in various configurations to treat exhaust gases of engine 12.

In addition to an emissions control or treatment system 56, vehicle 10 may also include one or more engine or motor driven accessories (ACC) 58. Because accessories 58 use torque produced by engine 12 and/or electrical energy from battery 46 and/or electrical machines 14, 40, one or more of the accessories 58 may be selectively controlled by VSC 50 to more accurately control torque production of engine 12 when operating near the combustion stability limit. For example, an air conditioning system may include a compressor 59 that is selectively controlled by VSC 50 during selected operating modes to more accurately control operation of engine 12.

Figure 2:
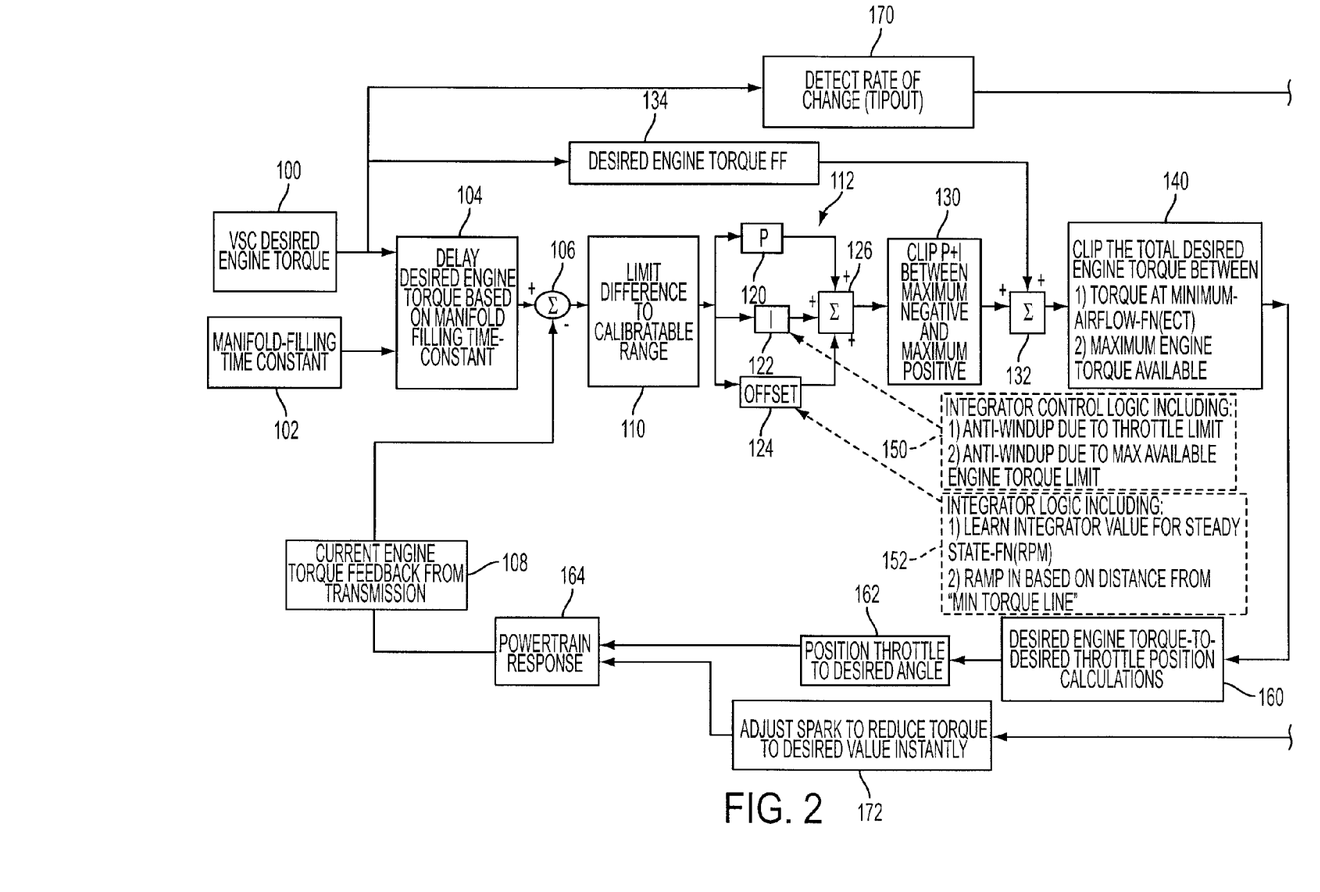
FIG. 2 is a controller block diagram illustrating operation of a system or method for controlling a vehicle powertrain according to one embodiment of the present invention.

FIG. 2 is a block diagram illustrating one embodiment of a system or method for controlling a vehicle powertrain according to the present invention. As those of ordinary skill in the art will understand, the functions or steps represented by the block diagram may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, although not explicitly illustrated. In one embodiment, the functions illustrated are primarily implemented by software, instructions, or code stored in a computer readable storage medium and executed by a computer or control module to control operation of the vehicle. Various conventional sensors or actuators are represented generally by corresponding blocks of the Figures.

The vehicle system controller determines a desired engine torque as represented by block 100. Determination of a desired engine torque will depend on a number of considerations that may be application and implementation specific. For the representative embodiment of an HEV illustrated in FIG. 1, the desired engine torque represents the amount of torque to be delivered by ICE 12 taking into consideration various ambient and vehicle operating conditions and/or modes that may include vehicle speed, engine speed, battery SOC, accelerator pedal position, engine coolant temperature, motor current, cruise control status, emission control system status, engine idle mode, etc. The desired engine torque represented by block 100 is filtered or delayed as represented by block 104 to account for the physical properties of the engine intake manifold as represented by manifold filling time constant 102. The filter or delay 104 may incorporate various estimated or measured operating parameters such as barometric pressure, mass air flow, ambient temperature, and the like to approximate the dynamics of the intake manifold.

The filtered or delayed desired torque value is compared to a current engine torque feedback signal or value 108 determined from transmission 38 and/or motor 40 to generate a torque difference signal or value at block 106. The torque difference value is then clipped or limited to a calibratable range as represented by block 110. The resulting torque value is then acted on by a proportional-integral (PI) controller 112 that includes a proportional term 120, an integral term 122, and an offset 124 applied to integral term 122. PI controller 112 may include anti-windup (and/or wind-down) integrator control logic 150 that limits the integrator value to improve transient performance and transitions between operating modes. For example, integrator anti-windup logic may be used to prevent undesirable integrator values resulting from the requested torque exceeding the maximum available engine torque limit or when the throttle valve reaches an open or closed stop position.

Torque offset 124 includes logic 152 for continuously updating a corresponding offset value based on an engine speed range when the engine is operating at steady-state within a predetermined region or range of the minimum engine torque line. In one embodiment, a torque offset is stored in a table in persistent memory, such as KAM 80, indexed by one of four engine speed ranges. The torque offset value is based on a rolling average of the previously stored value and a new value corresponding to a steady-state difference of the integral term 122. When the value is updated, integral term 122 is reset. During subsequent operation in the region near the minimum torque line, a torque offset corresponding to the current engine speed operating range is retrieved from memory and added to integral term 122. The torque offset value may be adjusted or ramped before being combined with the integral term with the adjustment or ramp based on the distance between the desired torque and the minimum torque as represented by block 152. Operation of one embodiment for the torque offset logic is illustrated and described in greater detail with reference to FIGS. 3 and 4.

The output of PI controller 112 is clipped or limited by maximum positive and maximum negative limits as represented by block 130. The output of block 130 is then combined with a desired engine torque feed forward (FF) term 134 at block 132. The output of block 132 is again compared to upper and lower limits and clipped or limited accordingly as represented by block 140. The lower limit represents the engine torque at minimum airflow, which is preferably a function of temperature. In the embodiment illustrated in FIG. 2, the torque at minimum airflow is stored in a lookup table accessed or indexed by engine coolant temperature with the minimum torque having a higher value for lower temperatures to account for increased frictional losses and reduced combustion efficiency of the engine. This feature of the present invention helps to reduce or eliminate susceptibility to misfire for cold engines that may otherwise affect the emission control system.

The adjusted and limited engine torque determined by block 140 is then used to control operation of the engine to produce the desired torque. In general, this includes fuel metering and spark or ignition timing (not shown) in addition to airflow control. In the embodiment illustrated in FIG. 2, airflow control is implemented by an electronic throttle control (ETC) with a throttle valve position determined in response to the determined airflow corresponding to the desired torque as represented by block 160. The ETC then uses feedback control to accurately position the throttle valve to achieve the desired airflow as represented by block 162. Depending upon the particular application and implementation, airflow control may be achieved using other engine actuators. For example, throttle-less engines and/or those with electronic valve actuation (EVA) may use intake and/or exhaust valve timing to control engine airflow. Similarly, engines may include a supercharger or turbocharger with boost controlled to modify intake airflow. As such, the present invention is independent of the particular engine technology used to effect the closed-loop torque control strategy.

As also illustrated in FIG. 2, the present invention includes detecting the rate of change of the desired engine torque requested by the VSC as represented by block 170. The rate of change may be determined by comparing the current desired engine torque to one or more previous values and filtering or averaging if desired. Monitoring the rate of change of the desired torque may be used to detect a rapid release of the accelerator pedal (generally referred to as tipout) so that spark or ignition timing may be used to rapidly adjust the engine torque output as represented by block 172. For example, when the detected rate of change exceeds a corresponding threshold, a spark control torque reduction routine or algorithm may be activated to more rapidly reduce the difference between the desired and current torque. Use of ignition timing control or spark retard is generally more responsive to rapid changes in desired torque relative to the response of the ETC or other airflow control devices. Closed loop spark timing control may also be used when the engine is operating in the predetermined region or range of the minimum torque line and closing the throttle valve or controlling other airflow control devices does not reduce torque sufficiently. The resulting indicated or combustion torque produced by the engine acts on the powertrain components as represented by block 164. A current engine torque feedback signal is then provided at block 108 and supplied to the feedback controller at block 106 as previously described.

While the present invention is described with a torque feedback signal supplied by the transmission and/or motor of a hybrid vehicle, the invention may also be applied to conventional powertrain implementations with an estimated or measured torque feedback signal. Although currently available torque sensors are not commercially viable for automotive applications, a number of methods have been developed to accurately estimate an "actual" torque based on other sensors in combination with ambient and engine operating conditions and parameters as known by those of ordinary skill in the art.

Figure 3:
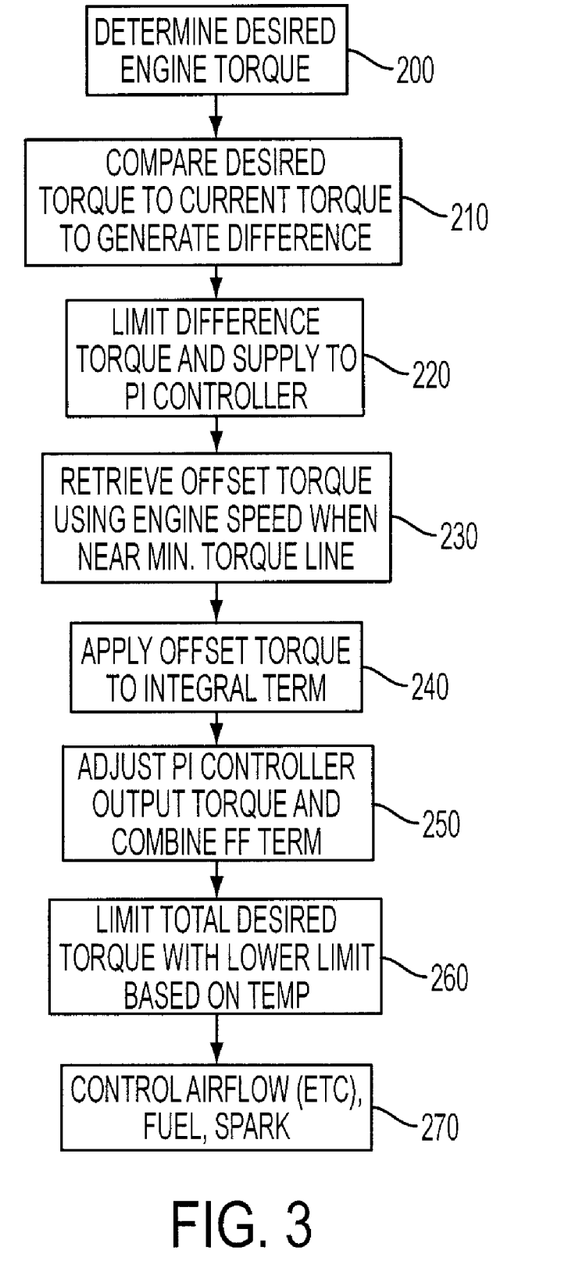
FIG. 3 is a flow chart illustrating operation of a system or method for controlling a vehicle powertrain according to one embodiment of the present invention.

FIG. 3 is a flowchart illustrating operation of a system or method for controlling a vehicle powertrain according to one embodiment of the present invention. Similar to the previously described Figures, the flowcharts of FIG. 3 (and FIG. 4) generally represent functions performed by hardware and/or software. Depending upon the particular application and implementation, one or more blocks, steps, or functions may be repeated or continuously performed although not explicitly illustrated. Likewise, various steps or functions may be performed in a sequence different from that illustrated, be performed in parallel, and/or omitted while still providing the closed loop control features of the present invention.

A desired engine torque is determined as represented generally by block 200. The desired engine torque may be determined using various vehicle and operator sensors and/or actuators and take into consideration a number of engine, vehicle, and ambient operating conditions. The desired torque is compared to a feedback signal or value representing the current torque being produced by the engine to generate a difference signal or value as represented by block 210. The difference torque is then clipped or limited to an acceptable range as determined by corresponding calibration values that determine an upper and lower limit with the limited value supplied to a controller, such as a PI controller as represented by block 220. Although the embodiments selected to illustrate the present invention utilize a PI controller, various other control strategies may be used within the scope of the present invention. For example, the present invention may be adapted for use with a proportional-integral-differential (PID) controller if desired.

When the engine is operating within a predetermined range of the minimum torque line (for example +/−5 nm), a stored torque offset value is retrieved based on current engine rotational speed as represented by block 230 and applied to the integral term of the PI controller as represented by block 240. In one embodiment, four engine speed ranges are used with a torque offset stored in persistent or non-volatile memory in a one-dimensional table or array indexed by the engine speed range, which spans 1000 rpm increments. Depending upon the particular application and implementation, a greater or lesser number of torque offset values may be stored and/or indexed by a different operating parameter and/or multiple engine or vehicle operating parameters, for example.

The resulting output torque value from the PI controller is clipped or limited and combined with a feed-forward desired engine torque term as represented by block 250. The resulting total desired engine torque term is again clipped or limited with the lower limit based on temperature, such as engine coolant temperature, as represented by block 260. This clipped or limited value is then used to control one or more of the airflow, fuel, and spark so the engine produces the total desired torque as represented by block 270.

Figure 4:
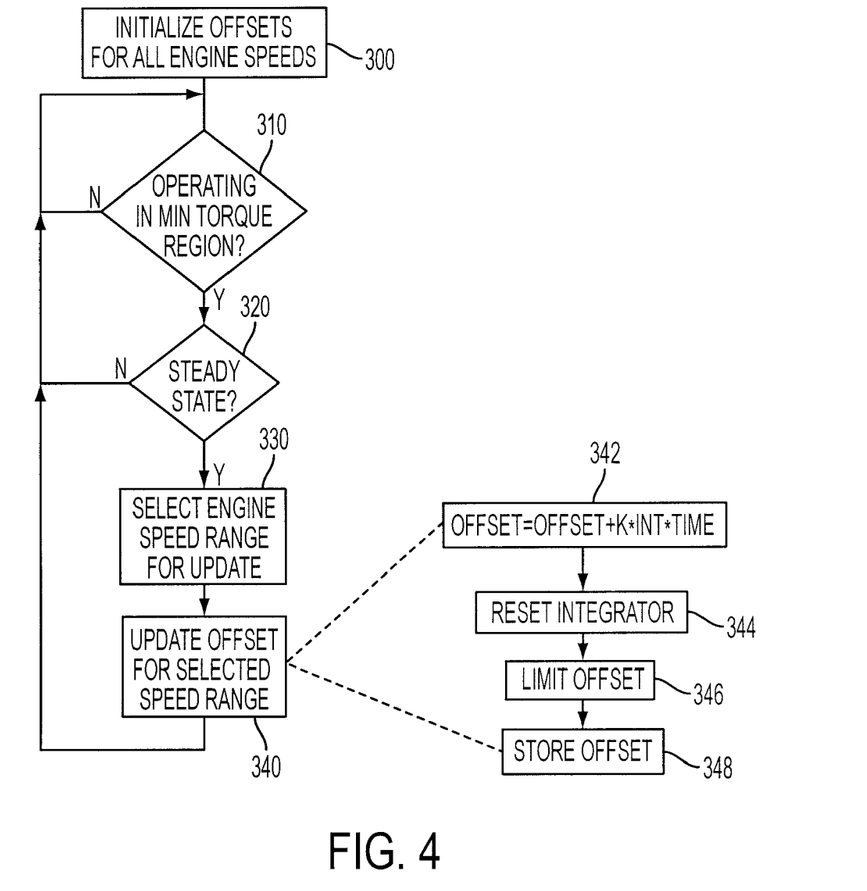
FIG. 4 is a flow chart illustrating operation of an adaptive torque offset for a system or method for closed loop torque control according to one embodiment of the present invention.

A flowchart illustrating operation of a torque offset for use in closed loop torque control for a vehicle powertrain according to one embodiment of the present invention is shown in FIG. 4. Block 300 initializes the torque offset table so that all entries contain a predetermined initial value. A representative value may be 7.5 nm, for example with allowable values ranging from 0 nm to 10 nm, for example. Block 310 determines if the engine is operating in a low load condition near the minimum torque or combustion stability limit. For example, block 310 may determine whether the desired engine torque supplied to the PI controller is within +/−5 nm of the minimum torque line for the engine. Depending upon the particular application, the minimum torque line for the engine may also be stored in non-volatile memory and indexed or accessed based on one or more engine, vehicle, or ambient operating conditions or parameters. When block 310 determines that the engine is operating within a predetermined range or region of the minimum torque value for current operating conditions, the process continues with block 320. Otherwise, the process returns to block 310 until the engine is operating in the low load region or range of minimum torque.

Block 320 determines whether the engine is operating in steady state, the definition of which may vary depending upon the application and implementation. In one embodiment, block 320 indicates steady state operation when the rate of change of desired torque and the absolute value of desired torque are less than corresponding thresholds for a predetermined period of time. When the engine is operating steady state as determined by block 320, block 330 selects an appropriate stored value for updating or learning based on the current engine speed and corresponding engine speed range. The selected memory or table location is then updated with a new torque offset value as represented by block 340 and described in greater detail with reference to blocks 342-348.

As represented by block 342 of FIG. 4, the new torque offset value is based on the previous value plus a gain factor multiplied by the steady state value of the integral term of the PI controller, which is multiplied by the elapsed time of the steady state value. The integrator value is then reset as represented by block 344. The new torque offset value may be limited or clipped to a predetermined range, such as between 0 nm and 10 nm, for example, as represented by block 346. The limited or clipped value is then stored in the corresponding location for the current engine speed range as represented by block 348.

As such, the present invention provides a robust closed-loop torque-based powertrain control for operation of an internal combustion engine that accurately controls torque, particularly under low load near the combustion stability limit. The present invention uses a learned or adaptive torque offset value based on an engine speed range to control engine torque when operating near the combustion stability limit, in addition to spark control to rapidly respond to accelerator pedal tipout and avoid overcharging the battery in HEV applications. The minimum operating torque parameter is selected based on temperature to account for weaker combustion at cold engine temperatures and improve combustion stability.

While the best mode for carrying out the invention has been described in detail, those familiar with the art to which this invention relates will recognize various alternative designs and embodiments for practicing the invention as defined by the following claims.

The invention claimed is:

1. A method for controlling a vehicle powertrain having an internal combustion engine, the method comprising:
   determining a desired engine torque and a current engine torque;
   determining a difference between the desired engine torque and the current engine torque;
   adjusting the difference using a stored torque offset corresponding to a current engine speed; and
   controlling the engine to produce a torque corresponding to the adjusted torque difference.

2. The method of claim 1 wherein the step of adjusting is performed only when the desired engine torque is within a predetermined range of a minimum engine torque.

3. The method of claim 1 further comprising applying a lower limit to the adjusted torque wherein the lower limit is based on an engine temperature.

4. The method of claim 3 wherein the engine temperature comprises engine coolant temperature.

5. The method of claim 1 further comprising:
   determining a rate of change of desired engine torque; and
   modifying ignition timing to reduce current engine torque when the rate of change of desired engine torque exceeds a corresponding threshold.

6. The method of claim 1 wherein the steps of determining a difference and adjusting the difference are performed by a proportional-integral controller and wherein the step of adjusting comprises adjusting an integral term of the controller.

7. The method of claim 6 further comprising:
   updating a stored torque offset value based on a steady-state value of the integral term of the controller; and
   resetting the integral term of the controller in response to updating the stored torque offset value.

8. The method of claim 7 wherein the step of updating comprises:
   selecting an engine speed range from a plurality of predetermined engine speed ranges based on current engine speed and updating the stored torque offset value corresponding to the selected engine speed range.

9. The method of claim 1 wherein the vehicle is a hybrid electric vehicle and wherein the step of determining a current engine torque comprises determining a current engine torque based on electrical current of an electrical machine coupled to the engine by a gearset.

10. A system for controlling a vehicle powertrain, the system comprising:
    an internal combustion engine;
    at least one electrical machine coupled to the internal combustion engine by a gearset;
    a controller in communication with the internal combustion engine and the at least one electrical machine, the controller determining a desired engine torque for the internal combustion engine and a current engine torque being produced by the internal combustion engine, the current engine torque being determined based on electrical current associated with the at least one electrical machine, determining a difference between the desired engine torque and the current engine torque, adjusting the difference using a stored torque offset corresponding to a current engine speed, and controlling the engine to produce a torque corresponding to the adjusted torque difference.

11. The system of claim 10 wherein the controller performs the step of adjusting only when the desired engine torque is within a predetermined range of a minimum engine torque.

12. The system of claim 10 wherein the controller compares the adjusted torque to a lower limit and sets the adjusted torque to the lower limit when the adjusted torque is less than the lower limit, the lower limit being retrieved from a memory within the controller based on current engine coolant temperature.

13. The system of claim 10 wherein the controller determines a rate of change of the desired engine torque and adjusts spark timing to rapidly reduce current engine torque to the adjusted desired engine torque when the rate of change of desired engine torque exceeds a corresponding threshold.

14. The system of claim 10 wherein the controller includes a proportional-integral feedback controller and wherein the step of adjusting comprises adjusting an integral term of the feedback controller.

15. The system of claim 14 wherein the controller updates a stored torque offset value based on a steady-state value of the integral term of the feedback controller and resets the integral term of the feedback controller in response to updating the stored torque offset value.

16. The system of claim 15 wherein the controller selects an engine speed range from a plurality of predetermined engine speed ranges based on current engine speed and updates the stored torque offset value corresponding to the selected engine speed range.

17. A computer readable storage medium having stored data representing instructions executable by a computer to control a vehicle powertrain having an internal combustion engine, the computer readable storage medium comprising:
    instructions for determining a desired engine torque and a current engine torque;
    instructions for determining a difference between the desired engine torque and the current engine torque;
    instructions for adjusting the difference using a stored torque offset corresponding to a current engine speed range when the desired engine torque is within a predetermined range of a minimum engine torque; and
    instructions for controlling the engine to produce a torque corresponding to the adjusted torque difference.

18. The computer readable storage medium of claim 17 further comprising:
    instructions for updating the stored torque offset corresponding to the current engine speed range based on a steady state value of an integral term of a proportional-integral controller.

19. The computer readable storage medium of claim 18 further comprising:
    instructions for resetting the integral term of the proportional-integral controller in response to updating the stored torque offset value.

20. The computer readable storage medium of claim 17 further comprising:
    instructions for determining a rate of change of desired engine torque; and
    instructions for modifying ignition timing to reduce current engine torque when the rate of change exceeds a corresponding threshold.

* * * * *